3,344,928
HUMIC ACID AS AN ADDITIVE IN A PROCESS OF FORMING A SALT-REJECTING MEMBRANE
Kurt A. Kraus, James S. Johnson, and Arthur J. Shor, Oak Ridge, Tenn., assignors to the United States of America as represented by the United States Atomic Energy Commission
No Drawing. Filed May 9, 1966, Ser. No. 548,790
8 Claims. (Cl. 210—500)

The invention described herein was made in the course of, or under, a contract with the Unted States Atomic Energy Commission and in the course of work performed for the Office of Saline Water of the United States Department of the Interior.

Our invention relates to hyperfiltration, or reverse osmosis methods of reducing the concentration of low-molecular-weight solutes in water by passing an aqueous solution through a permeable membrane under pressure.

Copending coassigned application Serial No. 504,272, filed October 23, 1965, for "Method of Making a Salt-Rejecting Membrane," discloses a method of making salt-rejecting membranes by passing an aqueous phase containing a dispersible material through a porous substrate. The dynamic membranes described therein, in addition to the advantages of in situ formation, high salt rejection values, and high flow rates, have the advantage that their salt-rejecting characteristics may be maintained at a high level by the addition of small quantities of membrane-forming material to the solution to be treated. In view of this self-healing characteristic of the membrane it is desirable to provide a membrane the integrity of which is capable of being maintained by substances inherently present in water to be treated, thus obviating the need for any additives to this water.

It is one object of our invention to provide an improved method of making salt-rejecting membranes.

Other objects of our invention will become apparent from the following specification and claims.

We have discovered that a membrane having excellent separative qualities is formed by providing humic acid as the dispersible material in an aqueous phase forced through a permeable substrate, and in accordance with our invention we have provided an improvement in a method of making a dynamic permeable membrane by passing an aqueous phase containing a dispersible material through a permeable substrate, said improvement comprising providing humic acid as the dispersible material.

The term "humic acid" as used herein refers to the readily water-extractable fraction of the decomposition products of vegetable matter. While these products consist largely of a mixture of organic acids, they also ordinarily contain colloidal matter. Consequently, by the term "humic acid" we mean not only these organic acids but also a mixture of these acids with this naturally occurring colloidal matter.

The mechanism by which salt rejection is achieved is not known. While the organic acids are clearly involved, colloidal materials when present appear to influence the rejection.

The use of humic acid as the dispersible agent in the water to be treated has the advantages that it is present as a contaminant in most natural waters, and can be prepared easily. Once the membrane has been established by passing through the porous substrate water containing a relatively high concentration of humic acid or inert constituents whose rejection properties can be enhanced by humic acid, it can be maintained by the addition of little or no material to the water to be treated.

In carrying out our invention a dynamic membrane is established by passing an aqueous phase containing humic acid through a porous substrate. As is disclosed in application Serial No. 504,272, the permeable substrate may be of any material capable of maintaining its integrity under the pressures involved and in the presence of water and its dissolved salts. The chemical nature of the substrate is not significant, and materials of such widely diverse natures as metal filters, porcelain frits, glass frits, and organic materials such as permeable papers may be used. Small-diameter porous carbon tubes will be especially useful.

The diameter of the pores in the substrate may normally range from about 30 A. to 5 microns and in circumstances where, in addition to the organic acids of humic acid, substances such as colloidal materials are present the maximum diameter may be several times as large.

The lower limit of humic acid concentration necessary to establish and maintain a rejection layer is not known. However, rejecting films have been established with as little as 2.5 parts per million humic acid and experiments indicate that films can be maintained with as little as 0.1 part per million humic acid.

While humic acid by itself forms a separative membrane, we have discovered that superior results can be achieved with the use of an ion exchanger, either organic or inorganic, with the humic acid. The concentration of ion exchanger used to establish the membrane may be as low as 10 parts per million. Once this membrane has been established its superior properties continue even in the absence of an ion exchanger in the feed.

The membrane formed by our process is capable of reducing the concentration of solute regardless of its initial concentration. The degree of concentration change in a single pass through the barrier is influenced by the species of salts present, the concentration of the salts, the size of the pores in the substrate, the pressure used to force liquid through the membrane, and the rate of flow of liquid parallel to the membrane surface.

The concentration of any salt may be reduced, but higher rejection values are attained with salts having polyvalent anions than with salts having polyvalent cations.

The pressure used must be greater than the difference in the osmotic pressure between the permeating and the feed solutions. Pressures of at least 50 pounds per square inch are desirable and pressures as high as several thousand pounds per square inch may be needed to attain the lowest unit costs for the product.

In carrying out our process the concentration of solute at the membrane must not be permitted to increase excessively over that of the feed solution. Concentration polarization and its attendant increase in the concentration of solute in the product can be minimized by circulation of the feed solution past the membrane at a rate high enough to maintain the concentration of salt at the membrane near the concentration of salt in the feed solution or by use of means to promote turbulence.

*Example I*

A permeable substrate was made by cutting disks from a 40-micron-thick silver filter having a nominal pore diameter of 0.2 micron. These disks were supported by a porous metal frit and mounted in apparatus adapted to circulate a high pressure aqueous solution over the disks. Humic acid was obtained by soaking oak leaves in water for 5–7 days and decanting the resulting liquid. This liquid in acid-base titration was found to contain 3–4 milliequivalents of titratable material per milliliter. Evaporation of the liquid produced 3 milligrams of dry material per milliliter of liquid. Enough liquid was added to an aqueous solution 0.1 molar in NaCl to give an additive concentration of 25 parts per million. This feed solution was circulated past the disks at a pressure of 1500 pounds per square inch. The flow rate through the disks was 60 gallons per day per square foot (g.p.d./ft.$^2$) and the salt rejection was 48 percent.

*Examples II–IV*

The substrate used in Example I was tested with several different solutes. The results of these examples together with the results of Example I are given in the following table.

TABLE
[Substrate: 0.2-micron silver frit; Additive: 25 p.p.m. humic acid]

| Example No. | Solute | Solute Concentration (Molar) | Pressure (p.s.i.) | Flow (g.p.d./ft.$^2$) | Rejection (percent) |
|---|---|---|---|---|---|
| I | NaCl | 0.1 | 1,500 | 60 | 48 |
| II | NaCl | 0.02 | 2,000 | 85 | 63 |
| III | Dilute Sea Water | 0.1 | 2,000 | 65 | 35 |
| IV | NaCl | 0.5 | 2,000 | 55 | 27 |

As can be seen from Examples I–IV, treatment of the porous substrate by contacting it with an aqueous solution containing humic acid makes it effective as a barrier for dissolved solute.

In the following example a test was made of the effect of combining humic acid with an inorganic ion exchanger. The ion exchanger used, bentonite, is one of the additives disclosed as effective by itself in copending application Serial No. 504,272.

*Example V*

A silver frit prepared as described in Example I was contacted with a solution 0.02 molar in NaCl and containing 45 milligrams per liter of bentonite. At 2000 pounds per square inch the flow through the frit was 60 g.p.d./ft.$^2$ and the solute rejection was 17 percent. Upon the addition of 25 milligrams per liter of humic acid as in Example I, at 2000 pounds per square inch the flow rate was 25 g.p.d./ft.$^2$ and the rejection increased to 87 percent. On further operation with feed of the same composition except that bentonite was omitted, 89 percent rejection at 12 g.p.d./ft.$^2$ was obtained.

As can be seen from Example V and a comparison of Example V with Example II, the rejection achieved by a combination of humic acid and bentonite is greater than was observed when using the additives separately.

Examples VI and VII below show the utility of humic acid as a membrane for removing solutes other than NaCl from solution.

*Example VI*

The silver frit of Example V was later contacted with a 0.01-molar Na$_2$SO$_4$ solution containing 25 milligrams per liter humic acid. At 2000 pounds per square inch 97 percent salt rejection was acheived at a flow rate of 16 g.p.d./ft.$^2$.

*Example VII*

In an experiment carried out in the same manner as Example VI using a solution 0.01 molar in MgCl$_2$ containing 25 milligrams per liter of humic acid a rejection of 58 percent was achieved at a flow rate of 12 g.p.d./ft.$^2$.

As can be seen from Examples VI and VII humic acid forms an effective barrier for bivalent as well as monovalent cations and anions.

In Examples VIII and IX below the utility of humic acid with different substrate materials is shown.

*Example VIII*

Millipore filter paper was treated with a solution 0.02 molar in NaCl and containing 250 milligrams per liter humic acid. At a pressure of 300 p.s.i. a rejection of 36 percent was achieved at a flow rate of 180 g.p.d./ft.$^2$.

*Example IX*

A porous carbon tube having a wall thickness of 0.050 inch and having a nominal pore diameter of 0.2 micron was used as a substrate. A solution 0.02 molar in NaCl and containing 25 milligrams per liter of humic acid was circulated through this tube. At a pressure of 400 pounds per square inch a rejection of 30 percent was achieved at a flow rate of 20 g.p.d./ft.$^2$.

The above examples are intended to illustrate, not to limit, our invention. It is obvious that changes may be made in the material and configuration of the substrate, in the concentration of humic acid, and in the composition of the aqueous solution without departing from our invention.

We claim:
1. In a method of making a dynamic permeable membrane capable of rejecting solutes comprising passing an aqueous phase containing a dispersible material through a porous substrate the improvement wherein said dispersible material comprises humic acid.
2. The method of claim 1 wherein the humic acid is present in a concentration of at least 0.1 part per million.
3. The method of claim 1 wherein the humic acid is present in a concentration of at least 2.5 parts per million.
4. The method of claim 1 wherein said aqueous phase contains an ion exchanger in addition to humic acid.
5. The method of claim 4 wherein said ion exchanger is an organic ion exchanger.
6. The method of claim 4 wherein said ion exchanger is an inorganic ion exchanger.
7. The method of claim 6 wherein said inorganic ion exchanger is bentonite.
8. The method of claim 7 wherein said bentonite is present in a concentration of at least 10 parts per million.

References Cited

UNITED STATES PATENTS 3,310,488   3/1967   Loeb _____ 210—22

OTHER REFERENCES

Saline Water Conversion Report for 1965, pp. 24–25, Office of Saline Water, U.S. Dept. of the Interior.

JOSEPH SCOVRONEK, *Acting Primary Examiner.*

S. MARANTZ, *Assistant Examiner.*